United States Patent [19]

Leitz et al.

[11] Patent Number: 4,875,564
[45] Date of Patent: Oct. 24, 1989

[54] SPRAY CLUTCH WITH A DOUBLE CAGE

[75] Inventors: Hermann Leitz, Heidelberg; Erich Krayer, Oftersheim; Rudolf Kohler, Sandhausen, all of Fed. Rep. of Germany

[73] Assignee: Borg-Warner Automotive GmbH, Fed. Rep. of Germany

[21] Appl. No.: 194,747

[22] Filed: May 17, 1988

[30] Foreign Application Priority Data

May 20, 1987 [EP] European Pat. Off. ........ 87107317.7

[51] Int. Cl.$^4$ ................ F16D 15/00; F16D 41/07
[52] U.S. Cl. .................. 192/45.1; 192/41 A; 186/82.8
[58] Field of Search ............ 192/41 A, 45.1; 188/82.8

[56] References Cited

U.S. PATENT DOCUMENTS

| | | | |
|---|---|---|---|
| 2,923,388 | 2/1960 | Nielsen | 192/45.1 |
| 2,940,568 | 6/1960 | Fagiano | 192/45.1 |
| 3,049,205 | 8/1962 | Ferris et al. | 192/45.1 |
| 3,075,623 | 1/1963 | Lund | 192/45.1 |
| 3,730,316 | 5/1973 | Zimmer | 192/45.1 X |
| 4,635,770 | 1/1987 | Shoji et al. | 192/45.1 X |
| 4,635,771 | 1/1987 | Shoji et al. | 192/45.1 X |
| 4,771,873 | 9/1988 | Kinoshita et al. | 192/41 A |

Primary Examiner—Leslie A. Braun
Assistant Examiner—Nicholas Whitelaw
Attorney, Agent, or Firm—Robert L. Zieg; James J. Jennings; James A. Geppert

[57] ABSTRACT

A double cage structure for a freewheel sprag clutch in which the inner cage ring is formed of metal and the outer cage ring is formed of a plastic material.

18 Claims, 6 Drawing Sheets

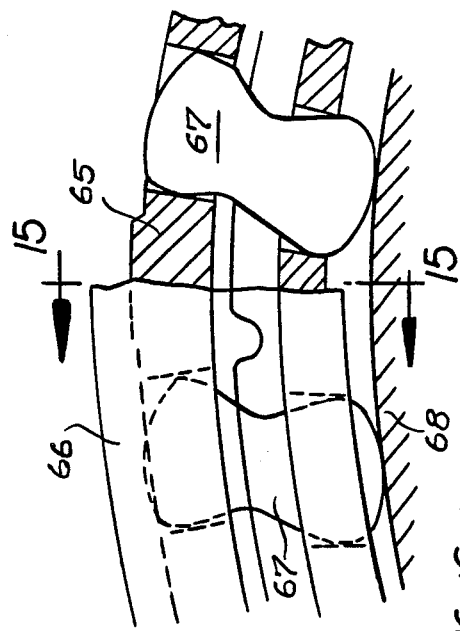
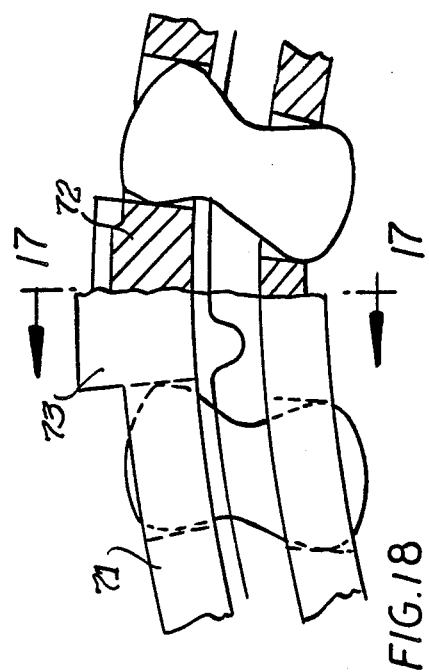
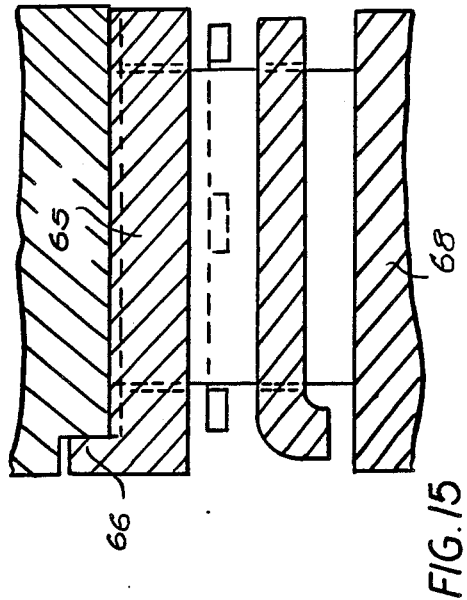
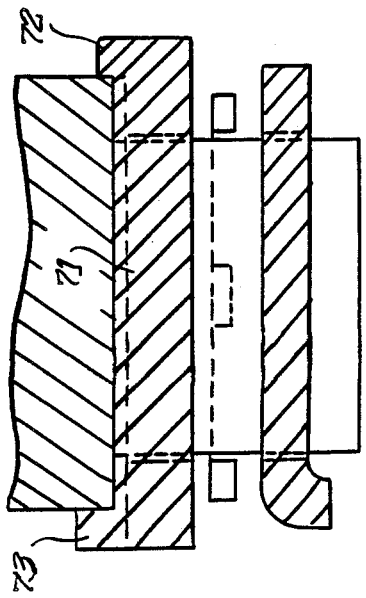

SPRAG CLUTCH WITH A DOUBLE CAGE

BACKGROUND OF THE INVENTION

The present invention relates to a sprag clutch with a double cage having an outer and an inner cage ring, as already known; for example as shown in U.S. Pat. No. 3,049,205.

There are multiple uses of the well-known double cages, mainly in the automotive industry. These cages are usually made of metal. For special applications, cages of plastic material have also been produced. Metal cages have certain properties which cannot be obtained by plastic cages and, on the other hand, plastic cages are superior to metal cages in certain respects.

For some of the problems occurring in automotive automatic transmissions, an optimum solution cannot be achieved by using double cages with metal cage rings nor by using a double cage consisting of plastic cage rings. The objective of the present invention is to provide an adequate remedy for the above problems.

SUMMARY OF THE INVENTION

The solution achieved by the present invention for a double-cage sprag-clutch is in the use of an outer cage formed of a plastic material, whereas the inner cage is made of metal. This combination of a plastic cage ring combined with a metal cage ring shows surprising results.

There are numerous applications where the load on the outer cage is not so high that metal, especially steel, must be used for its manufacture. The inner cage ring is subjected to higher loads and should be formed of metal to assure a high loading capacity and long service life. The manufacture of the outer cage ring of plastic is relatively inexpensive, offering the possibility of fulfilling several functions by an appropriate formation of the outer cage ring without increasing the costs of manufacture. This would not be possible for a cage formed of metal which would lead to additional expense.

As a further development of the present invention, the outer cage may be provided with crosspieces at its outer peripheral surface which are frictionally engaged with the outer ring or race of the freewheeling clutch assembly so as to be locked together. As a result, the clips which are normally used for the attachment of the one-way clutch in the races may be omitted.

Moreover, it is possible to provide radially projecting cams on the periphery of the outer cage, which are received in an annular ring formed on the inner surface of the outer race of the clutch. Preferably, these cam are formed on several flexible tongues or cross bars on the outer cage ring. The tongues allow a slight travel stroke of the cams so that they snap into the annular groove when the cage is inserted into the outer ring or race of the one-way clutch.

In order to avoid incorrect assembly of the cage and outer ring or race, the outer cage ring may also be provided with an encompassing collar or with a second row of cams arranged of a greater radial height compared to the first row of cams. This collar or second row of cams are to prevent incorrect installation of the outer cage in the outer ring or race of the freewheel clutch.

Furthermore, the outer cage may be provided, at least on one side, with a clip which corresponds to respective clips of an adjacent oil dam disc. Such a clip preferably consists of tongues with hooks molded on the edge of the outer cage ring cooperating with slots having sections for the hooks formed in the adjacent oil dam disc. The tongues are inserted into the slots with the hooks gripping behind the sections.

For many applications, it is advantageous to have oil dam discs reinforced and shaped as support rings for the clutch cages. These support rings may have a U-shaped cross section and, for further reinforcement, may be provided with radial supports cut and molded on their axial front surface in such a way that the radial sections rest against the arms formed by the U-profile. In cases of small axial forces and low temperatures, the oil dam discs can also serve as friction bearings to absorb the axial forces.

According to another solution, it is advantageous to provide the outer clutch cage, at least at one side, with hub-shaped projections, each of which has a slight torus. Then the lateral discs for the clutch engage the projections of the outer cage ring with their outer arm and the torus with their bends or tongues.

DESCRIPTION OF THE DRAWINGS

The invention is explained below with the aid of several examples of the mode of execution wherein the drawings disclose the following.

FIG. 15 is a cross sectional view taken on the line 15—15 of FIG. 16 showing a outer cage ring having a collar.

FIG. 16 is a side elevational view, partly in cross section, of the cage ring of FIG. 15.

FIG. 17 is a cross sectional view taken on the line 17—17 of FIG. 18 showing an outer cage ring with two rows of cams of differing heights.

FIG. 18 is a side elevational view, partly in cross section, of the cage ring of FIG. 17.

DESCRIPTION OF THE INVENTION

Figure 1:
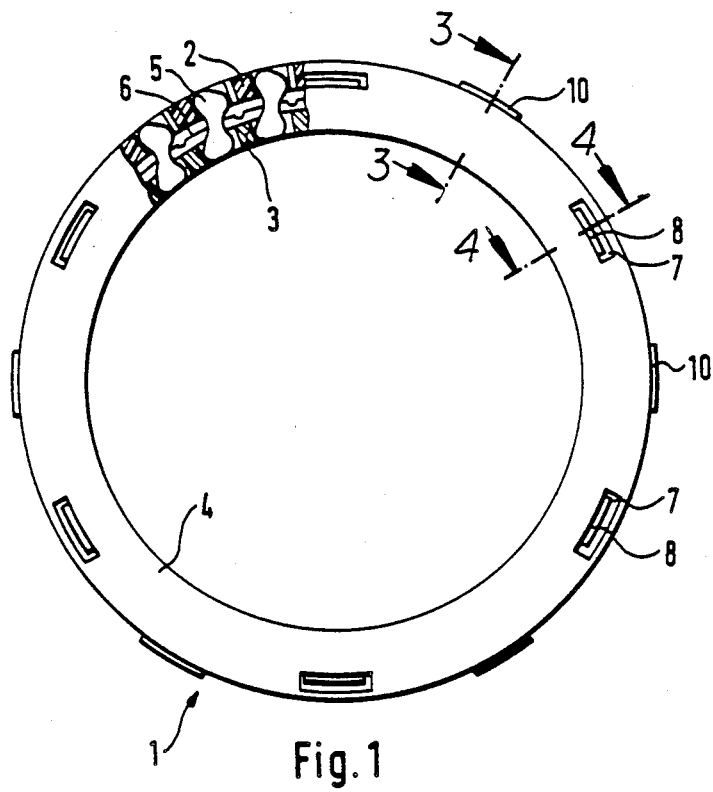
FIG. 1 is a top plan view of the sprag clutch having a double cage.

The one-way sprag-type clutch 1 shown in FIG. 1 is provided with a double cage construction consisting of an outer cage 2 and an inner cage 3 shown in the top plan view with a lateral disc 4 being partly broken away in order to show the positions of the cages 2 and 3 as well as the sprags 5. The sprags are energized in the clamping direction by a central spring 6. The outer cage ring 2 is formed of a plastic material while the inner cage ring 3 is formed of metal.

Figure 2:
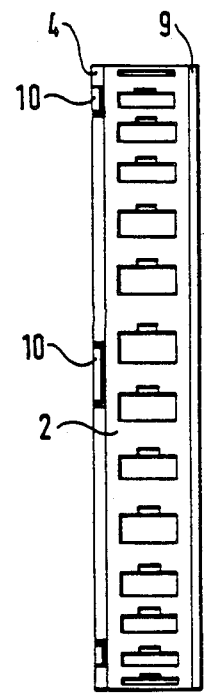
FIG. 2 is a side elevational view of the clutch according to FIG. 1 without clips.

As is shown particularly in FIG. 2, the clutch cage 1 is provided with lateral discs 4 and 9, which are reinforced. The lateral discs 4 and 9 each have slots 7 therein in which tongues 8 of the outer cage ring 2 engage in order to lock the outer ring 2 and the lateral discs 4 and 9 together through clips.

Figure 3:
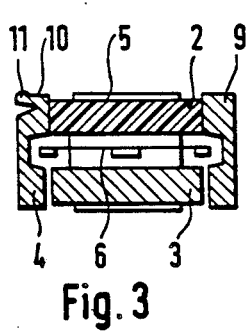
FIG. 3 is a cross sectional view through the clutch taken on the line 3—3 of FIG. 1.

FIG. 3 is a sectional view along line 3—3 of Figure 1 wherein the reinforcement of the lateral rings 4 and 9 is clearly visible. Lateral ring 4 is provided with cams 10 which are distributed at several locations on its periphery and serve for the attachment of ring 4 and, consequently, of the complete cage assembly in the outer ring or race of the one-way clutch; the ring or race being omitted in this view. The cams 10 have the shape of spring-activated flaps with a projection of a cam 11 at their outer ends.

Figure 4:
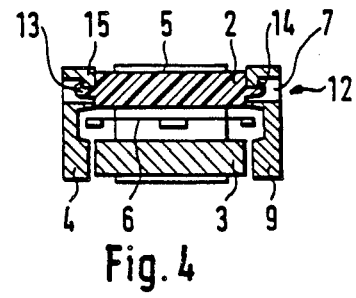
FIG. 4 is a cross sectional view through the clutch taken on line 4—4 of FIG. 1.

FIG. 4 is a cross sectional view along line 4—4 of FIG. 1, in which the clip connection between the outer cage 2 and the lateral discs 4 and 9 is visible. Clip connection 12 consists of a plurality of tongues 13 with hooks 14 formed on the outer cage. Tongues 13 project into slots 7 in the lateral discs 4 and 9 and extend behind the shoulders 15 with their hooks to make engagement. In this way, the lateral discs are interconnected with the outer ring 2. Inner ring 3 is enclosed between lateral discs 4 and 9 and, as a result, a closed unit is formed of the outer ring 2, the inner ring 3, lateral discs 4 and 9, the sprags 5 and the spring 6.

In the present design of a double cage clutch, the cage, which is fixed between two one-way clutch rings or races, can serve as a radial support through lateral discs 4 and 9. The wall thickness and strength of the lateral discs 4 and 9 depends on the magnitude of the forces to be absorbed.

Figure 5:
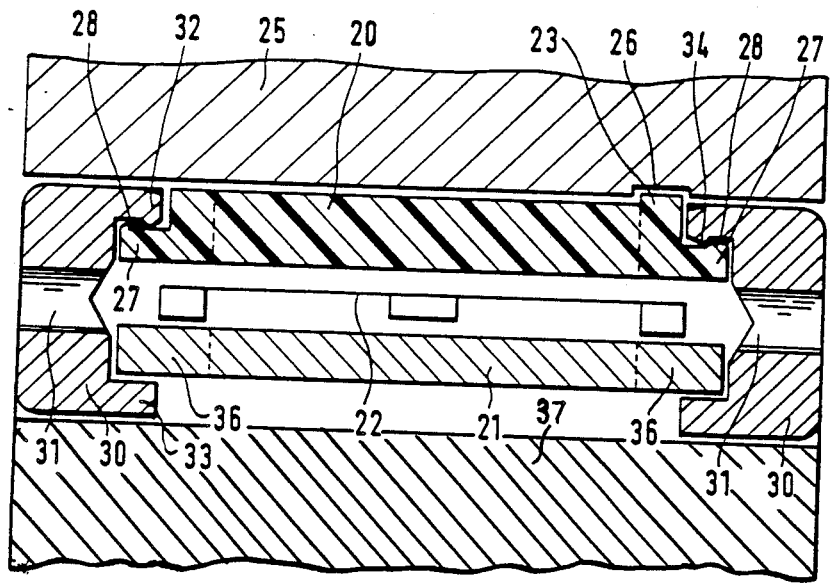
FIG. 5 is an enlarged cross sectional view of an alternate embodiment of the clutch embodying the present invention.

FIG. 5 discloses an upper part of a clutch cage, with the outer cage ring 20 being made of a plastic material as described in the aforementioned example. The inner cage ring 21 of the clutch cage is formed of metal. Spring 22 energizes the sprags, which are not shown. Outer ring 20 of the cage is provided along one side with several radially projecting cams 23, which are received in an annular groove 26 provided in the surface of the outer race or ring 25. In this manner, the entire cage is protected against axial displacement thereof. Furthermore, the outer ring 20 is provided on both faces with hub-shaped projections 27, each of which has a slight torus 28.

Lateral discs 30, used in this version as slide bearing rings an inner race 37, are at the same time designed as oil dam discs having several bores 31 distributed on their periphery through which the oil can flow. The reinforced version of the lateral discs 30 is clearly visible. Lateral discs of this kind may also be described as support rings.

In the cross-sectional view, the lateral discs 30 are U-shaped. Their arms 32 and 33 enclose the projections 27 of the outer cage ring 20 and the extended ends 36 of the inner cage ring 21. Distributed on the perimeter of the lateral discs 30, the arms 32 are, at certain intervals, provided with bends 34, which lock in recesses behind torus 28, when the lateral disc 30 is pressed onto the cage ring.

Figure 7:
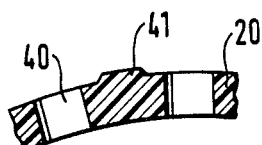
FIG. 7 is an enlarged cross sectional view of a segment of the outer cage ring of FIG. 6.
Figure 6:
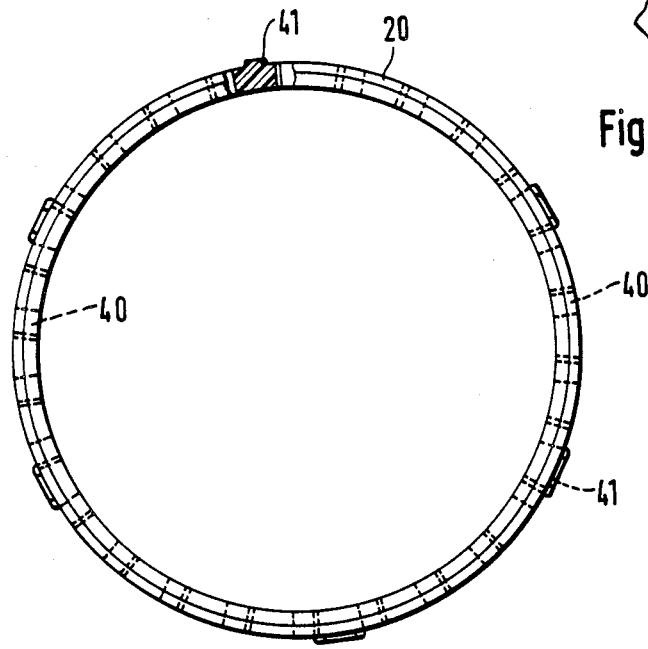
FIG. 6 is a top plan view of the outer cage ring.

FIG. 6 shows an outer cage ring formed of plastic material which can be used in FIG. 5. In the perimeter of the outer cage ring 20, numerous windows 40 are provided for the insertion of the sprags. The outer cage ring 20 has crosspieces 41 at several locations with which it contacts the outer race 25 of the one-way clutch in order to frictionally lock with the outer race 25. FIG. 7 shows an enlargement of a crosspiece 41 in a segment of cage 40.

Figure 8:
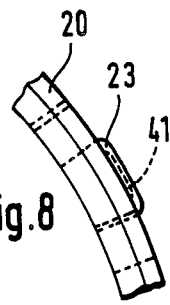
FIG. 8 is an enlarged side elevational view of a segment of the outer cage ring of FIG. 6.

For the present embodiment, crosspieces 41 are distributed at six locations on the outer cage ring 20. In the same area, as can be seen in FIG. 8, the radially projecting cams 23 are installed, which are received into the annular groove 26 of the outer ring 25 of the freewheel clutch.

Figure 9:
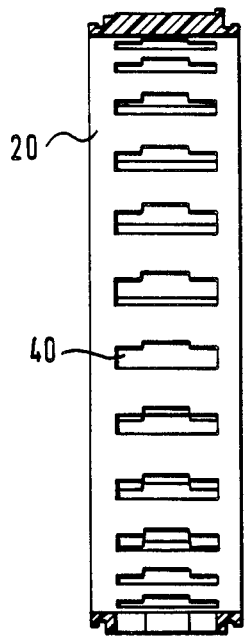
FIG. 9 is a side view, partly in cross section of the outer cage ring of FIG. 6.

FIG. 9 shows the outer cage ring 20 of FIG. 6 in cross section. One can see the arrangement and design of cage windows 40.

Figure 10:
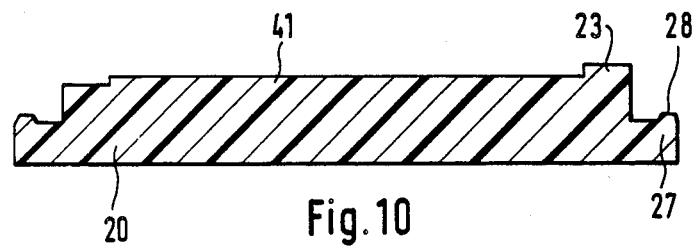
FIG. 10 is an enlarged cross sectional view through the cage ring of FIG. 9.

FIG. 10 is an enlarged sectional view through the cage ring 20, with the section cut through a crosspiece 41 and a cam 23.

Figure 11:
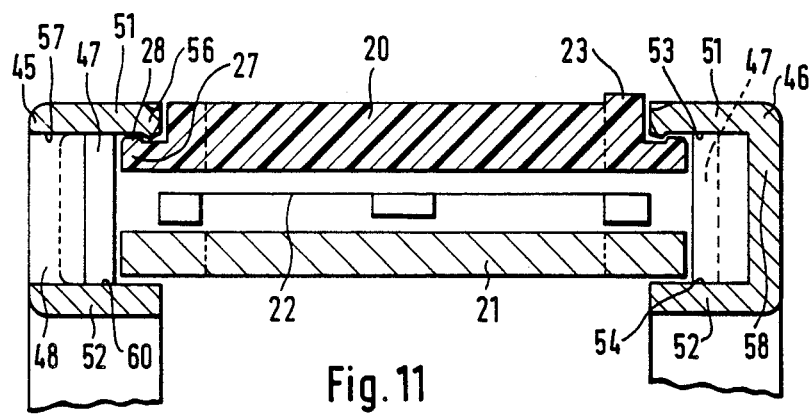
FIG. 11 is an enlarged cross sectional view of another embodiment of sprag clutch.

FIG. 11 shows another embodiment wherein the double cage with its outer ring 20 and inner ring 21, as well as the sprags (not shown) and spring 22, correspond in principle to the version according to FIGS. 5 to 9. The difference, however, is in the design of the lateral discs 45 and 46. These lateral discs 45 and 46 are reinforced and U-shaped in their cross section. On their perimeters, radial supports 47 or 50 are installed for further stiffening of the lateral discs 45 and 46. The radial supports 47 and 50 make it possible to use side rings which require less material and are easier to produce than the side rings according to FIG. 5. This also provides the desired passages for the oil.

Radial supports 47 are pushed out of the front wall 48 of lateral ring 45 by cutting front wall 48 along three lines by the punching method. The radial supports 47 remain connected to the front wall 48 only on side 49. Radial supports 50 are crimped flanges which are produced by cutting front face 58 at only two places using a stamping process. Ends 59 of supports 50 remain in the lateral ring 58.

Figure 12:
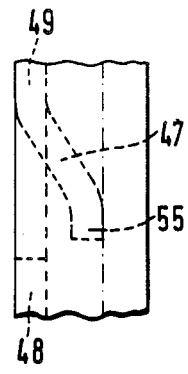
FIG. 12 is a partial top plan view of a portion of the clutch of FIG. 11.
Figure 13:
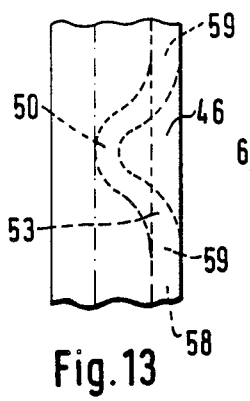
FIG. 13 is a view similar to FIG. 12 of an alternate embodiment.

The radial supports 47 and 50 occupy the entire width of lateral rings 48 and 58 between arms 51 and 52 of the U-shaped lateral rings 45 and 46, respectively. Inner surfaces 60 and 57 of arms 51 and 52 contact the outer and the inner sectional surfaces 53 and 54 of radial supports 47 and 50, respectively. As can be seen in FIG. 12, the radial supports 47 may have a bend 55 to their free ends.

Outer arms 51 of lateral discs 48 and 58 may also be provided with tongues 56 distributed on the perimeter for locking with the projections 27 of torus 28, as described in the version according to FIG. 5.

Figure 14:
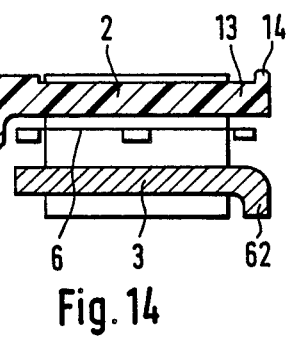
FIG. 14 is a cross sectional view similar to Figure 4 of a fourth embodiment of sprag clutch.

FIG. 14 discloses a variation of the one-way clutch in which, instead of the snap connections between the outer cage ring 2 and the two lateral discs 4 and 9 shown in FIG. 4, a lateral oil dam disc 61 is molded in one piece integral with one side of the outer cage ring 2. Thus, manufacturing and assembly costs are saved. On the side away from oil dam disc 61, tongues 13 with hook attachments 14 are provided to produce the clip connection with a lateral disc on the outer cage ring 2. On the side away from oil dam disc 61, the inner cage ring 3 has connections 62 which are bent radially inward at about 90°.

FIGS. 15 and 16 disclose an outer cage ring 65 having an annular collar 66 at one side to aid in the lateral positioning and assembly of the cage in the outer race 25. The sprags 67 are shown relative to the outer race and the inner race 68.

Also, FIGS. 17 and 18 disclose an outer cage ring 71 having a first row of cams 72 and a second row of cams 73 of a greater height than the cams 72, both rows of cams cooperating with the outer race for the clutch.

The following functional elements provided in the technique of working with plastic for the outer cage ring are:

1. Crosspieces at the outer periphery of the outer cage ring produce friction locking with the inner diameter of the outer clutch race.

2. Cams at the outer periphery of the outer cage ring axially secure the sprag clutch in the outer race by snapping into a ring groove cut in the inner diameter of the outer race.

3. Several forms of clip connection between the outer cage ring and lateral discs may be designed as oil dam discs or supporting rings.

4. The integral formation of a lateral disc (oil dam disc) with the outer cage ring at the front face thereof.

We claim:

1. A one-way sprag clutch having a double cage between inner and outer races including an outer cage ring and an inner cage ring each cage ring having opposite sides, the improvement comprising that the inner cage ring is formed of metal and the outer cage ring is formed of plastic.

2. A one-way sprag clutch according to claim 1, wherein the outer cage ring is provided on its radially outwardly directed surface with crosspieces to produce friction locking with the outer race of the clutch.

3. A one-way sprag clutch according to claim 1, wherein the outer cage ring includes several radially protruding cam distributed on its periphery, and the freewheel outer race has an annular groove formed therein receiving said cams.

4. A one-way sprag clutch according to claim 2, wherein the outer cage ring includes a plurality of radially protruding cams in its periphery which are higher than the crosspieces.

5. A one-way sprag clutch according to claim 1, wherein lateral discs are provided on the opposite sides of the cages, and the outer cage ring is provided with clip connections on at least one side corresponding to clip connections on the corresponding lateral disc.

6. A one-way sprag clutch according to claim 5, wherein said clip connections comprise a plurality of tongues with hook attachments on the outer cage ring, said lateral discs having slots with heels cooperating with the hook attachments.

7. A one-way sprag clutch according to claim 5, wherein said lateral discs are provided with lateral bores allowing oil flow therethrough.

8. A one-way sprag clutch according to claim 5, wherein said lateral discs are designed as supporting rings for the clutch races.

9. A one-way sprag clutch according to claim 8, wherein said support rings have a U-shaped cross section with outer and inner arms receiving said cage rings therebetween.

10. A one-way sprag clutch according to claim 9, wherein each support ring has a front face with inwardly extending radial supports contacting the ends of the cage rings.

11. A one-way sprag clutch according to claim 10, wherein said supports each are formed by punching along three sides to provide a free bent inner end.

12. A one-way sprag clutch according to claim 10, wherein said supports each are formed by stamping along two edges and crimped inwardly.

13. A one-way sprag clutch according to claim 1, wherein said outer cage ring is provided with hub-shaped annular projections at at least one location, which projections have a slight torus.

14. A one-way sprag clutch according to claim 9, wherein said lateral discs have their outer arms surrounding projections on said outer cage ring with bends interlocking with the torus.

15. A one-way sprag clutch according to claim 4, wherein at least one lateral disc has a plurality of resilient flaps formed on the perimeter adapted to engage the outer race of the clutch to retain the parts together.

16. A one-way sprag clutch according to claim 5, wherein one lateral disc is integral with the outer cage ring to provide an oil dam disc.

17. A one-way sprag clutch according to claim 1, wherein said outer cage ring has a revolving collar integral therewith.

18. A one-way sprag clutch according to claim 13, including a second row of cams on the outer cage ring which are higher than the first mentioned cams.

* * * * *

UNITED STATES PATENT AND TRADEMARK OFFICE
CERTIFICATE OF CORRECTION

PATENT NO. : 4,875,564
DATED : October 24, 1989
INVENTOR(S) : Hermann Leitz, Erich Krayer and Rudolf Kohler It is certified that error appears in the above—identified patent and that said Letters Patent is hereby corrected as shown below:

In the Title:

"SPRAY CLUTCH WITH A DOUBLE CAGE" should be
--SPRAG CLUTCH WITH A DOUBLE CAGE--

Signed and Sealed this

Sixteenth Day of October, 1990

Attest:

HARRY F. MANBECK, JR.

*Attesting Officer*    *Commissioner of Patents and Trademarks*